US005960134A

United States Patent [19]

Sakamoto et al.

[11] Patent Number: 5,960,134

[45] Date of Patent: Sep. 28, 1999

[54] OPTICAL SWITCH CAPABLE OF DETECTING SWITCHING OPERATION

[75] Inventors: Hideyuki Sakamoto, Atsugi; Hiroshi Komazawa, Isehara, both of Japan

[73] Assignee: Anritsu Corporation, Tokyo, Japan

[21] Appl. No.: 08/980,688

[22] Filed: Dec. 1, 1997

[30] Foreign Application Priority Data

Dec. 9, 1996 [JP] Japan ..................................... 8-344532

[51] Int. Cl.[6] ........................................ G02B 6/26

[52] U.S. Cl. ................................ 385/20; 385/16; 385/22; 385/26; 385/47

[58] Field of Search .............................. 385/16, 17, 18, 385/19, 20, 15, 21, 22, 26, 23, 33–38, 47

[56] References Cited

U.S. PATENT DOCUMENTS 5,278,692 1/1994 Delapierre ................................ 385/16

5,420,946 5/1995 Tsai ........................................ 385/16

5,664,034 9/1997 Mock ...................................... 385/16

*Primary Examiner*—Phan T. H. Palmer

*Attorney, Agent, or Firm*—Frishauf, Holtz, Goodman, Langer & Chick, P.C.

[57] ABSTRACT

To know an optical path switching error, a stepping motor is rotated at a predetermined angular step so as to couple an optical fiber collimator attached to its rotating shaft to an optical fiber collimator of optical fiber collimators that is designated by a designation signal. The direction of the optical axis of the optical fiber collimator is detected by a slit disk attached to the rotating shaft, and sensors for detecting slit arrays formed in the slit disk. Detection signals from the sensors are determined to correspond to the designation signal.

20 Claims, 6 Drawing Sheets

| ANGLE | LIGHT-RECEIVING SIGNAL | COUPLED OPTICAL FIBER COLLIMATOR |
|---|---|---|
| REFERENCE POSITION | 1 1 1 1 1 1 | — |
| 3.6° | 0 0 0 0 0 1 | $27_1$ |
| 7.2° | 0 0 0 0 1 0 | $27_2$ |
| 10.8° | 0 0 0 0 1 1 | $27_3$ |
| 14.4° | 0 0 0 1 0 0 | $27_4$ |
| ⋮ | ⋮ | ⋮ |
| 43.2° | 0 0 1 1 0 0 | $27_{12}$ |
| ⋮ | ⋮ | — |

OPTICAL SWITCH CAPABLE OF DETECTING SWITCHING OPERATION

BACKGROUND OF THE INVENTION

The present invention relates to an optical switch and, more particularly, to an optical switch having a technique for confirming whether a switching operation is correctly performed in the optical switch used to switch an optical path.

As is well known, in the optical communication system, for example, when a plurality of optical lines each made of an optical fiber are to be tested, test light must be input to each line by sequentially switching the lines. In this case, an optical switch has conventionally been used.

The optical switch used for the above purpose has a plurality of light guides for inputting/outputting light, and is constituted such that a specific light guide can be selectively coupled to another designated light guide.

FIG. 10 shows the mechanism portion of a conventional optical switch for mechanically changing the direction of the optical axis of a specific light guide to switch the optical path.

In this optical switch, the tip of one optical fiber collimator (prepared by arranging a lens at the tip of the fiber) 1 constituting the specific optical guide is rotated by a stepping motor 2 every predetermined angle $\alpha$.

Remaining optical fiber collimators $\mathbf{3}_1, \mathbf{3}_2, \ldots, \mathbf{3}_n$ are laid out such that the optical axis of each optical fiber collimator 3 coincides with the optical axis of the optical fiber collimator 1 at every interval of the predetermined angle $\alpha$.

By supplying, to the stepping motor 2, a pulse signal necessary for rotating the optical fiber collimator 1 through an angle $N \cdot \alpha$ (N is an integer), the optical fiber collimator 1 can be optically coupled to an arbitrary one of the remaining optical fiber collimators $\mathbf{3}_1, \mathbf{3}_2, \ldots, \mathbf{3}_n$.

In the optical switch using, as a driving source, the stepping motor 2 which rotates through an accurate rotation angle in accordance with an electrical (pulse) signal supplied in the above manner, an error may occur in the stepping motor itself, a circuit for supplying a driving pulse to the stepping motor, or the like.

In this case, even if the optical axis of the specific optical fiber collimator 1 does not coincide with that of a desired optical fiber collimator 3, this cannot be externally known.

When, therefore, this optical switch is used to test many optical lines, as described above, an erroneous test may be performed.

Another conceivable method is to detect the intensity of light passing through the optical fiber collimator.

In this case, however, the light intensity must be measured at a connection portion between the optical fiber collimator and the optical line in order to measure the intensity of test light in a test system of testing the optical line made of an optical fiber.

For this reason, measurement of the light intensity adversely affects an optical line test.

BRIEF SUMMARY OF THE INVENTION

It is, therefore, an object of the present invention to provide an optical switch in which the above-mentioned problems are solved, and an optical path switching error can be known.

According to the present invention, there is provided an optical switch comprising a plurality of light guides for inputting/outputting light, optical path formation means, having a driving source which operates upon reception of an electrical signal, for forming an optical path extending from a specific light guide of the plurality of light guides to arbitrary one of remaining light guides in order to optically couple the specific light guide to the one arbitrary light guide, switching means for supplying, to the driving source of the optical path formation means, a predetermined electrical signal for coupling the specific light guide to the one arbitrary light guide, and detection means for detecting a formation position of the optical path formed by the optical path formation means.

Note that the optical path formation position detected by the detection means is the formation position of an optical path formed by the optical path formation means that changes depending on a combination of the specific light guide and each of the remaining light guides.

Additional objects and advantages of the invention will be set forth in the description which follows, and in part will be obvious from the description, or may be learned by practice of the invention.

The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Figure 1:
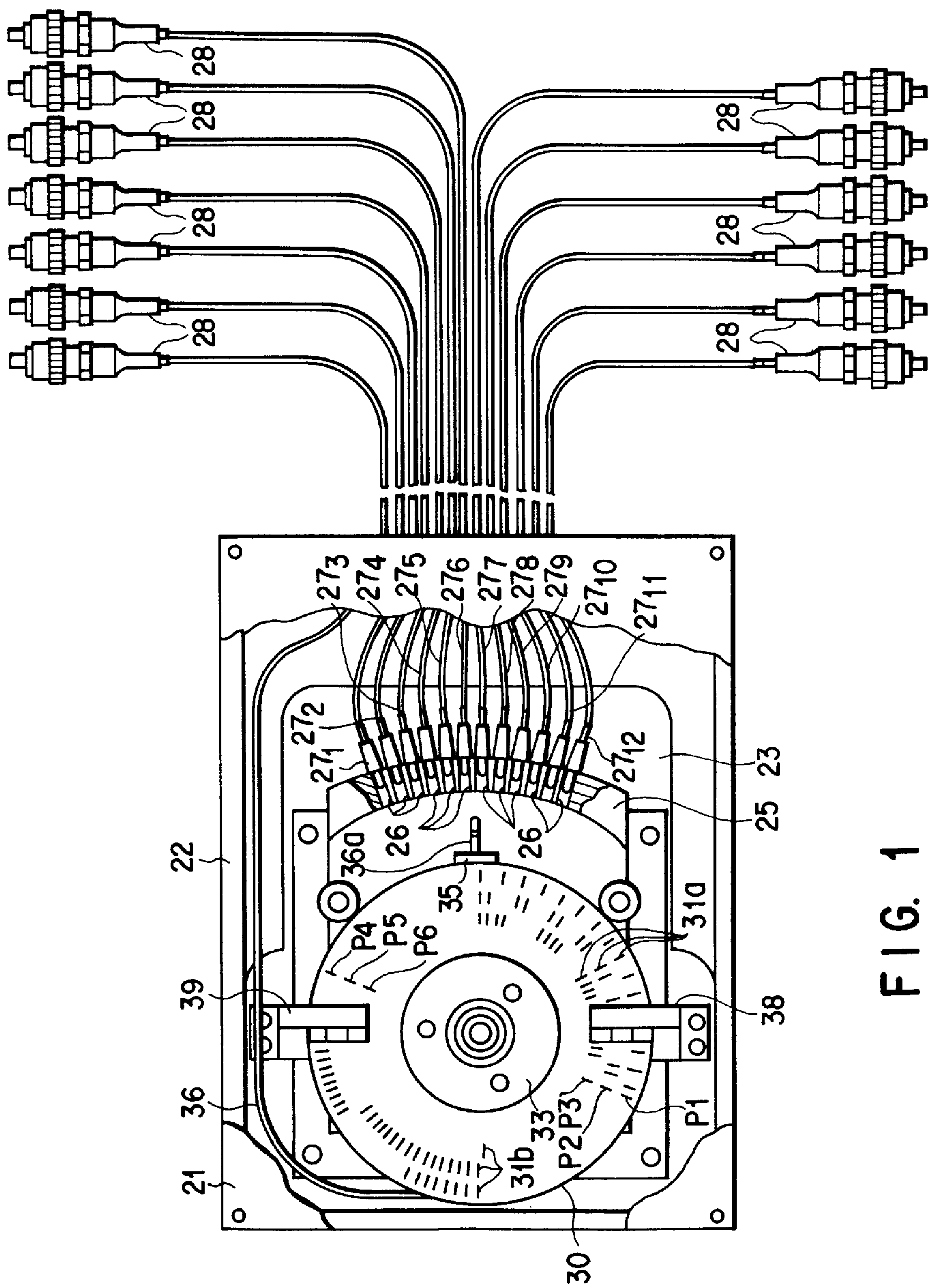
FIG. 1 is a plan view showing the mechanism portion of an optical switch according to an embodiment of the present invention.

Reference will now be made in detail to the presently preferred embodiments of the invention as illustrated in the accompanying drawings, in which like reference characters designate like or corresponding parts throughout the several drawings.

The present invention will be generally described. To achieve the above object, as shown in FIG. 1, an optical switch of the present invention having a plurality of light guides (27$_1$–27$_{12}$, 36) for inputting/outputting light, a variable mechanism (24, 35) which has a driving source (24) that operates upon reception of an electrical signal, and which varies the direction or position of at least one specific light guide of the light guides or an optical member interposed between the specific light guide and another light guide in order to optically couple the specific light guide and another arbitrary light guide, and a switching means (40) for receiving a signal designating any one of the remaining light guides, and supplying an electrical signal corresponding to the signal, to the driving source of the variable mechanism to couple the specific light guide to the designated light guide comprises a detection means (30, 38, 39) arranged in the variable mechanism to detect the direction or position of the specific light guide or the optical member interposed between the specific light guide and another light guide that is varied by the variable mechanism, and a determination means (42) for determining whether an output from a sensor corresponds to the signal designating the light guide.

An optical switch according to an embodiment of the present invention based on the above general description will be described below with reference to the several views of the accompanying drawing.

Figure 2:
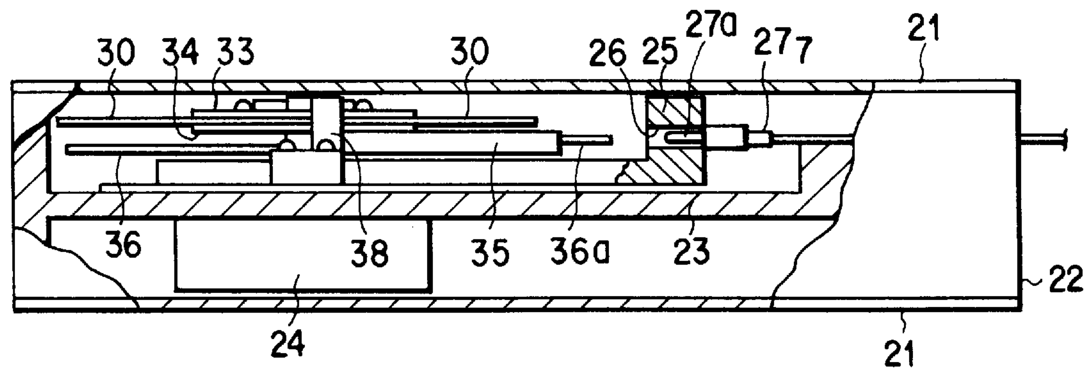
FIG. 2 is a side view showing the mechanism portion of the optical switch according to the embodiment of the present invention.
Figure 3:
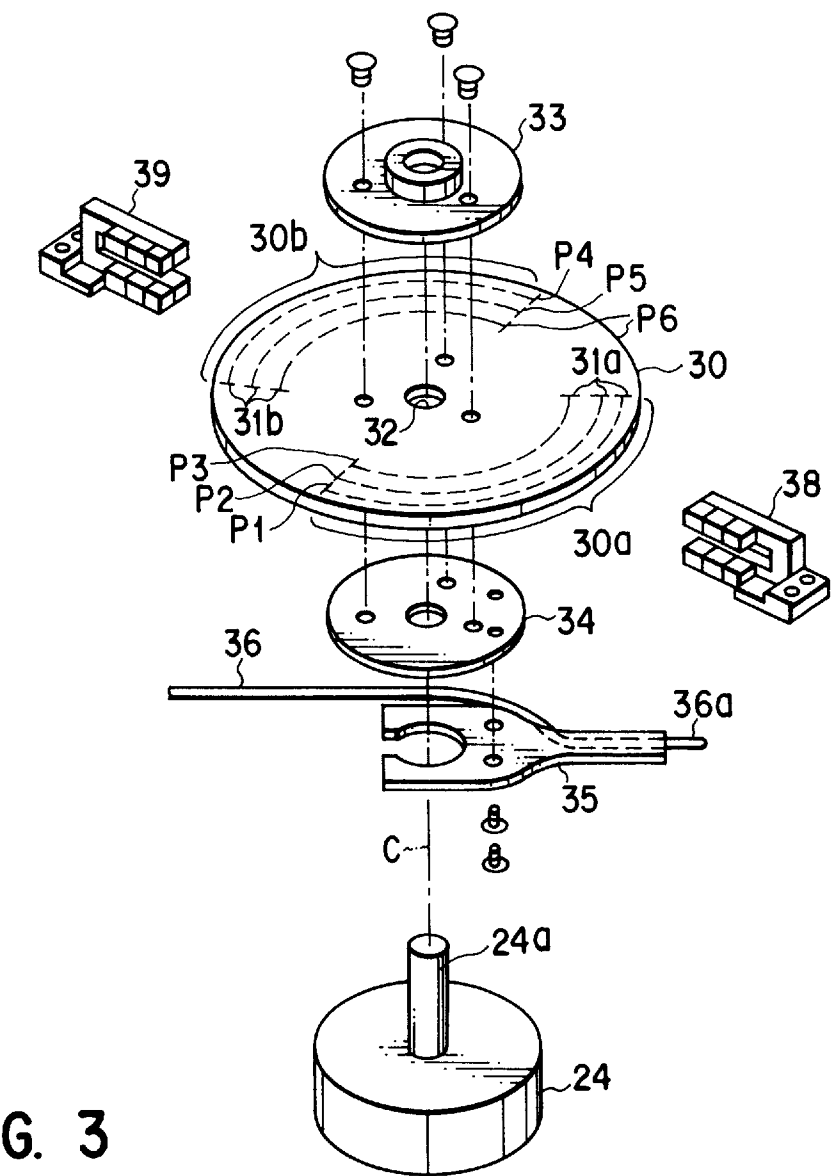
FIG. 3 is an exploded view showing the main part of the mechanism portion of the optical switch according to the embodiment of the present invention.

FIGS. 1 to 3 are views showing the mechanism portion of the optical switch according to the embodiment of the present invention.

In FIGS. 1 to 3, the mechanism portion of the optical switch is incorporated in a box-like chassis 22 having upper and lower portions closed with covers 21.

The interior of the chassis 22 is divided into upper and lower portions by a partition plate 23.

A variable mechanism of this embodiment and a stepping motor 24 serving as its driving source are fixed on the lower surface of one end of the partition plate 23 so as to protrude a rotating shaft 24*a* to the upper surface side of the partition plate 23.

The stepping motor 24 is constituted to rotate its rotating shaft 24*a* at a resolution of, e.g., 0.9°.

A holder 25 stands on the upper surface of the other end of the partition plate 23.

The holder 25 has 12 horizontal support holes 26 centered on an axis C of the rotating shaft 24*a* of the stepping motor 24 at an interval of 3.6°.

One end 27*a* of each of 12 optical fiber collimators 27$_1$ to 27$_{12}$ serving as light guides is fitted in a corresponding support hole 26 of the holder 25.

An optical connector 28 is attached to the other end of each of the optical fiber collimators 27$_1$ to 27$_{12}$ extending from the chassis 22.

A slit disk 30 serving as an encoder for presenting an optical path formation position corresponding to the rotation angle is concentrically attached to the upper portion of the rotating shaft 24*a* of the stepping motor 24.

Three arrays P1 to P3 of slits 31*a* and three arrays P4 to P6 of slits 31*b* are formed in two symmetrical peripheral areas 30*a* and 30*b* of the slit disk (encoder) 30 to detect the angle of the optical axis of an optical fiber collimator 36 (to be described later).

While the slit disk (encoder) 30 is fitted on the rotating shaft 24*a* of the stepping motor 24 through a hole 32 formed in the center of the slit disk 30, the slit disk 30 is screwed to be vertically sandwiched between two attaching members 33 and 34 as small-diameter disks, and fixed to the rotating shaft 24*a* of the stepping motor 24 together with the attaching members 33 and 34.

A holder 35 is fixed on the lower surface of the attaching member 34.

The holder 35 horizontally supports one end 36*a* of the optical fiber collimator 36 constituting a specific light guide of this embodiment.

One end 36*a* of the optical fiber collimator 36 is supported such that one end 36*a* is flush with one end 27*a* of each of the optical fiber collimators 27$_1$ to 27$_{12}$, and the optical axis of the optical fiber collimator 36 rotates about the axis C of the rotating shaft 24*a* of the stepping motor 24.

The optical fiber collimator 36 can be optically coupled to any one of the remaining optical fiber collimators 27$_1$ to 27$_{12}$ by rotation of the stepping motor 24.

The other end of the optical fiber collimator 36 is pulled out outside the chassis 22, and an optical connector 28 is attached to the tip of the other end, similar to the optical fiber collimators 27$_1$ to 27$_{12}$.

Sensors 38 and 39 constituting a detection means of this embodiment together with the slit disk 30 are arranged at positions symmetrical about the rotating shaft 24*a* of the stepping motor 24.

Each of the sensors 38 and 39 is a photointerrupter made up of three pairs of light-transmitting and light-receiving portions vertically facing each other with a gap, and fixed to the partition plate 23 so as to pass the slit array of the slit disk (encoder) 30 through the gap.

One sensor 38 irradiates light on the slit arrays P1 to P3 from one surface side of the slit disk 30, and receives the light passing through the slits 31*a* in units of slit arrays to output parallel light-receiving signals.

The other sensor 39 irradiates light on the slit arrays P4 to P6 from one surface side of the slit disk (encoder) 30, and receives the light passing through the slits 31*b* in units of slit arrays to output parallel light-receiving signals.

Figures 4, 5:
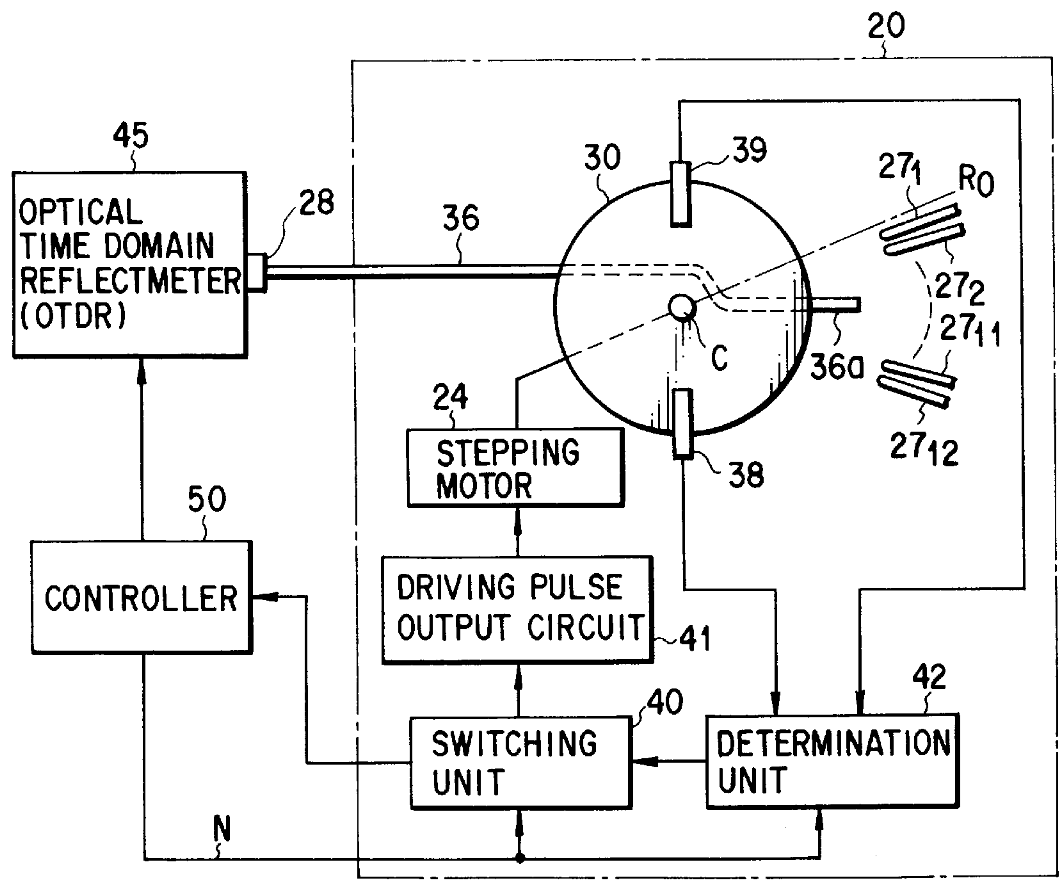
FIG. 4 is a table showing the relationship between the direction of the optical axis of a specific optical fiber collimator and an output from a sensor.
FIG. 5 is a block diagram showing the arrangements of the optical switch and a measurement system according to the embodiment of the present invention.

FIG. 4 shows the relationship between the direction of the optical axis of the optical fiber collimator 36 and the light-receiving signals output parallel from the sensors 38 and 39.

More specifically, in FIG. 4, the least significant bit is a light-receiving signal for the slit array P1, the second bit is a light-receiving signal for the slit array P2, . . . , the most significant bit is a light-receiving signal for the slit array P6, and the light-receiving signal is represented by 6-bit data using [1] as a signal upon receiving light and [0] as a signal upon receiving no light.

As shown in FIG. 4, when the optical axis of the optical fiber collimator 36 directs a reference position $R_0$ shifted outward from the optical axis of the optical fiber collimator 27$_1$ to the optical fiber collimator 27$_1$ by 3.6°, parallel data [111111] is output from the sensors 38 and 39 which detect the heads of the slits 31*a* and 31*b* of the respective slit arrays P1 to P6.

When the optical axis of the optical fiber collimator 36 rotates clockwise (in FIG. 1) through 3.6° from the reference position $R_0$ (the optical axis of the optical fiber collimator 36 coincides with that of the optical fiber collimator 27$_1$), data [000001] is obtained.

The data value is set to be incremented by one every time the optical axis of the optical fiber collimator 36 rotates clockwise through 3.6°. At an angular position between the slit arrays, the light-receiving signal data is [000000].

A data value output from the sensors 38 and 39 which detect optical path formation position information presented by the slit disk (encoder) 30, except for the data value [000000], corresponds to the number (the suffix of the reference numeral) of each of the optical fiber collimators $\mathbf{27}_1$ to $\mathbf{27}_{12}$ when the optical fiber collimators $\mathbf{27}_1$ to $\mathbf{27}_{12}$ are sequentially counted from the one nearest to the reference position $R_0$.

FIG. 5 shows the whole arrangement of an optical switch 20 having the above mechanism portion, and the configuration of a test system using it.

In FIG. 5, a switching unit 40 of the optical switch 20 is constituted by, e.g., a CPU, and receives a designation signal output from a controller 50 (to be described later) to output a pulse signal necessary for coupling the optical fiber collimator 36 to an optical fiber collimator 27 corresponding to the designation signal, from a driving pulse output circuit 41 to the stepping motor 24.

When the switching unit 40 receives a signal indicating an error from a determination unit 42 (to be described later) upon driving the stepping motor 24, it performs processing such as re-driving of the stepping motor 24 in accordance with the signal.

The determination unit 42 is constituted by, e.g., a CPU. The determination unit 42 checks whether output data from the sensors 38 and 39 corresponds to the designation signal after the switching unit 40 changes the direction of the optical axis of the optical fiber collimator 36. If so, the determination unit 42 outputs a signal indicating normal switching to the switching unit 40; otherwise, the determination unit 42 outputs a signal indicating an error, and the data from the sensors 38 and 39 to the switching unit 40.

When a test is performed for a plurality of optical lines each made of an optical fiber by using the optical switch 20 having this arrangement, the optical connector 28 of the optical fiber collimator 36 of the optical switch 20 is connected to an optical pulse tester (Optical Time Domain Reflectometer: OTDR) 45. At the same time, the optical connectors 28 of the optical fiber collimators $\mathbf{27}_1$ to $\mathbf{27}_{12}$ are connected to lines to be tested (not shown). The controller 50 controls the optical switch 20 and the optical pulse tester 45 to sequentially and automatically test the lines by using optical pulses.

The optical pulse tester (OTDR) 45 supplies an optical pulse to a fiber, and obtains the level of the light (Fresnel reflected light or back scattering light) returning from the fiber to its incident end until a predetermined time elapses after supplying the optical pulse. From changes in level over time, the optical pulse tester 45 measures changes in loss of the fiber, and the presence/absence or position of a disconnection or the like.

Figure 6:
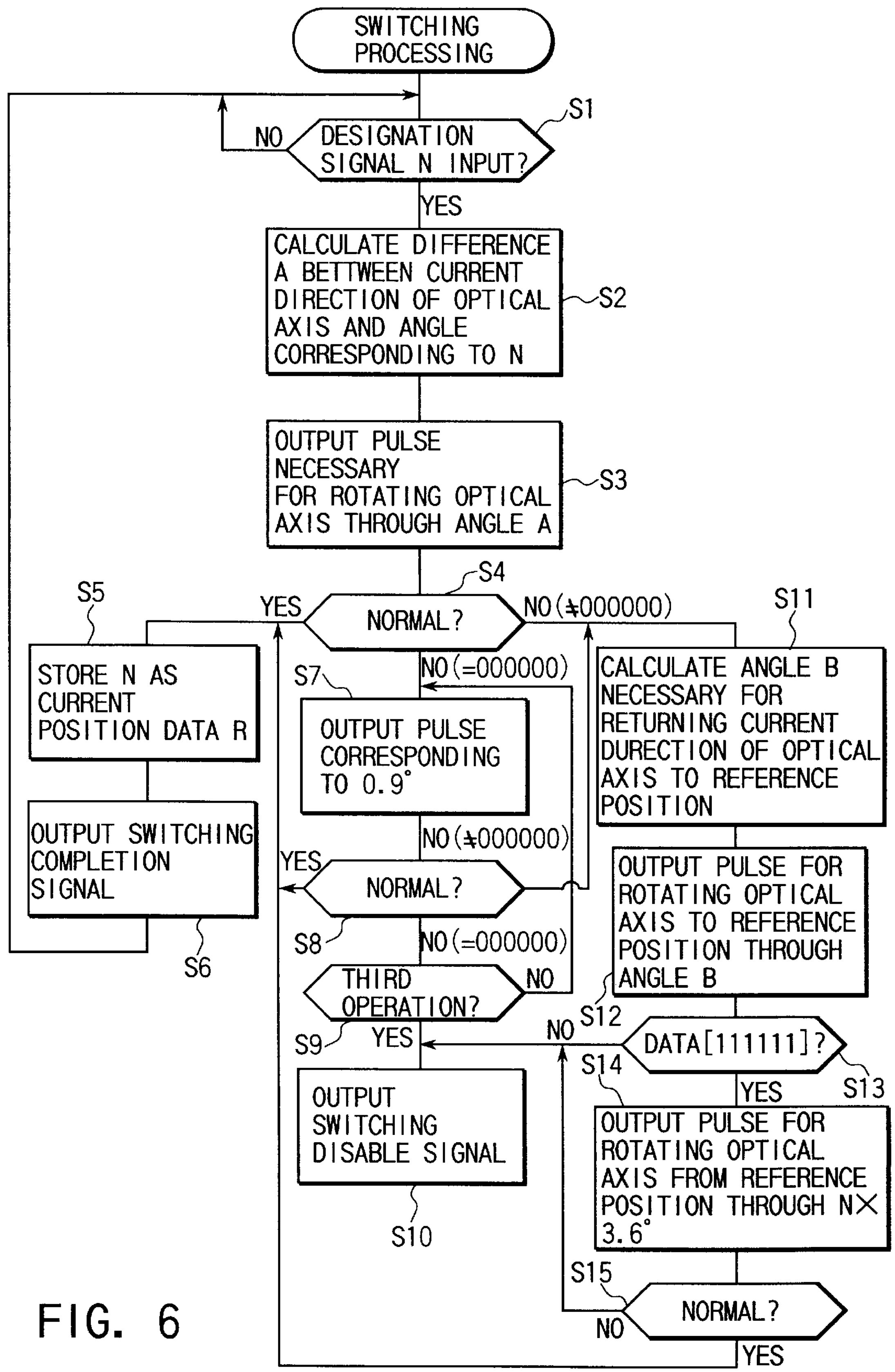
FIG. 6 is a flow chart showing the processing procedure of the main part of the optical switch according to the embodiment of the present invention.

FIG. 6 is a flow chart showing the processing procedure of the switching unit 40 of the optical switch 20 used in the above test system.

The operation of the optical switch will be explained below with reference to FIG. 6.

Assume that the controller 50 inputs a signal N (=3) designating the third optical fiber collimator $\mathbf{27}_3$ to the optical switch 20 while the optical axis of the optical fiber collimator 36 directs the reference position $R_0$ (step S1).

Then, the switching unit 40 calculates an angle A (in this case, A=3×3.6°) defined between the current direction (reference position) of the optical axis of the optical fiber collimator 36, and a position where the optical axis of the optical fiber collimator 36 coincides with that of the optical fiber collimator $\mathbf{27}_3$ (step S2).

The switching unit 40 causes the driving pulse output circuit 41 to output, to the stepping motor 24, pulses corresponding to a number (for example, A/0.9=12 when 0.9°-rotation can be attained for one pulse) required to rotate the optical axis of the optical fiber collimator 36 through the angle A (step S3).

Figure 7A:
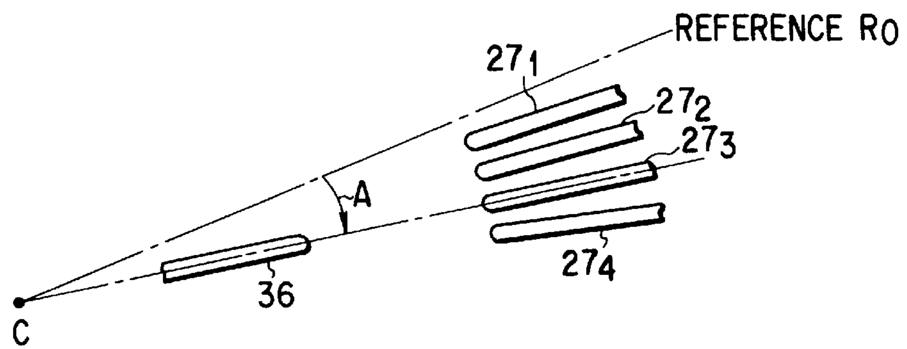
FIGS. 7A, 7B, and 7C are views for explaining the operation of the optical switch according to the embodiment of the present invention.

As shown in FIG. 7A, the stepping motor 24 which receives the pulses tries to rotate the optical axis of the optical fiber collimator 36 through the angle A from the reference position $R_0$, make the optical axis of the optical fiber collimator 36 coincide with that of the third optical fiber collimator $\mathbf{27}_3$ designated, and obtain a predetermined optical path formation position.

After the switching unit 40 rotates the stepping motor 24, the determination unit 42 checks whether 6-bit data from the sensors 38 and 39 corresponds to the designation signal N (=3) (in this embodiment, they correspond to each other).

As shown in FIG. 7A, when the optical axis of the optical fiber collimator 36 coincides with that of the third optical fiber collimator $\mathbf{27}_3$ designated, data from the sensors 38 and 39 is [000011], which coincides with the designation signal N (=3). Therefore, the determination unit 42 determines that the predetermined optical path formation position is obtained, and outputs a signal indicating normal switching (step S4).

Upon reception of this signal, the switching unit 40 stores the designation signal N as data R representing the current position in a memory (not shown), outputs a signal indicating switching completion to the controller 50, and returns to step S1 to wait for input of a next designation signal (steps S5 and S6).

Figure 7B:
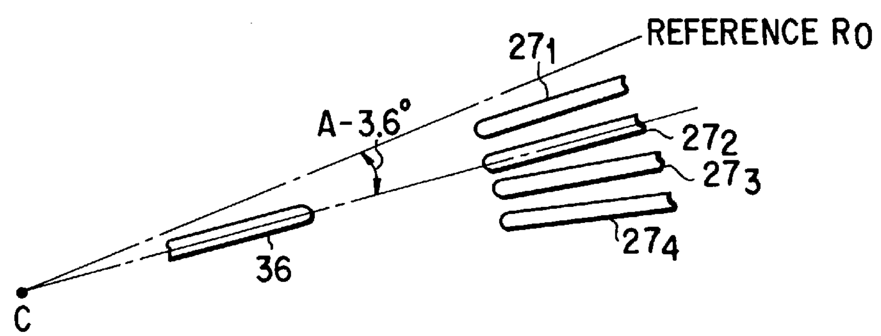

Assume that an error occurs in the stepping motor 24, and the sensors 38 and 39 output data [000010] though the optical axis of the optical fiber collimator 36 is at a position where it coincides with the optical axis of the second optical fiber collimator $\mathbf{27}_2$, as shown in FIG. 7B.

Figure 7C:
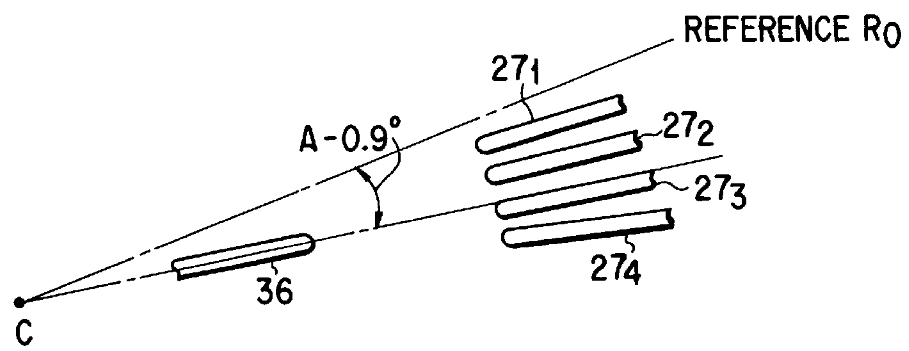

In addition, assume that the optical axis of the optical fiber collimator 36 is at a position shifted by, e.g., 0.9° from the optical axis of the third optical fiber collimator $\mathbf{27}_3$ designated, and the sensors 38 and 39 output data [000000], as shown in FIG. 7C.

In the case of noncoincidence, the determination unit 42 determines that the predetermined optical path formation position cannot be obtained, and outputs a signal indicating an error, and the data to the switching unit 40 (step S4).

Upon reception of the data [000000] together with the signal indicating an error from the determination unit 42, the switching unit 40 causes the driving pulse output circuit 41 to output a pulse so as to rotate the stepping motor 24 every step of 0.9° over the range of +2.7° because the current direction of the optical fiber collimator 36 is unknown (step S7).

The switching unit 40 checks the determination result of the determination unit 42 every time a pulse corresponding to 0.9° is output. If the determination unit 42 outputs a signal indicating normal switching, the flow shifts to step S5 (step S8).

However, when data from the determination unit 42 remains [000000] even upon supplying a pulse corresponding to 2.7°, the switching unit 40 outputs a signal indicating a switching failure to the controller 50 (steps S7 to S10).

When the switching unit 40 receives data except for [000000] together with a signal indicating an error from the determination unit 42 in step S4 or S8, it calculates an angle B to the reference position $R_0$ from the data, and causes the driving pulse output circuit 41 to output a pulse for rotating the stepping motor 24 through the angle B toward the reference position $R_0$ (steps S11 and S12).

The switching unit 40 checks the determination result of the determination unit 42. When the switching unit 40 receives data [111111] together with a signal indicating an error from the determination unit 42, it outputs, to the stepping motor 24, pulses corresponding to a number required to rotate the optical axis of the optical fiber collimator 36 to an angular position corresponding to the designation signal N, and then checks the determination result of the determination unit 42 again. If the determination result indicates normal switching, the flow shifts to step S5; otherwise, the flow shifts to step S10 to output a signal indicating switching failure to the controller 50 (steps S13 to S15).

If the controller 50 receives a signal indicating switching completion from the optical switch 20 after outputting the designation signal N to the optical switch 20, it supplies an optical pulse from the optical pulse tester 45 to a line to be tested which is connected via the optical switch 20 to the optical fiber collimator $\mathbf{27}_3$ corresponding to the designation signal, and obtains changes in level of the light returning from the line by using the optical pulse tester (OTDR) 45. After the controller 50 makes the user check an increase in loss of the line or the presence/absence of a disconnection, the controller 50 outputs, to the optical switch 20, a designation signal N corresponding to an optical fiber collimator connected to a next line to be tested, thereby testing the next line.

If the controller 50 receives a signal indicating a switching failure from the optical switch 20, it interrupts the test, and notifies the manager of the test system of the switching failure. Alternatively, the controller 50 supplies a designation signal corresponding to a next line to be tested to the optical switch 20. When receiving a signal indicating a switching failure from the optical switch 20, the controller stops the test.

More specifically, the common optical fiber serving as a specific light guide connected to each of optical paths serving as a plurality of light guides, and the slit disk (encoder) having slits representing optical path data are fixed with a predetermined positional relationship on the switching driving unit (stepping motor) of the optical switch according to the present invention.

The detection means (photointerrupter) for reading optical path data from the slits of the slit disk (encoder) is fixed with a predetermined positional relationship with the switching driving unit.

The external control unit supplies optical path data 1 to the stepping motor in order to connect the common optical fiber to a predetermined optical path.

Then, the stepping motor operates to move the common optical fiber and the slit disk (encoder), thereby connecting the common optical fiber to the predetermined optical path.

At this time, the photointerrupter detects optical path data 2 from the slits of the slit disk (encoder).

The switching operation of the optical switch is determined by comparing optical path data 1 and data 2 with each other.

If the switching operation of the optical switch is normal, the optical path data 1 is identical to data 2; otherwise, they are not identical.

By determining the switching operation of the optical switch, therefore, the reliability of the optical path test can be increased.

In this manner, the optical switch 20 can know whether the specific optical fiber collimator 36 is coupled to a designated optical fiber collimator 27.

Erroneous measurement performed when the specific optical fiber collimator 36 is not coupled to any optical fiber collimator or is coupled to an optical fiber collimator different from a designated optical fiber collimator can be prevented.

When the specific optical fiber collimator 36 cannot be correctly coupled to the designated optical fiber collimator, they are tried to be coupled again after the optical axis of the optical fiber collimator 36 is rotated over a predetermined range or temporarily returned to a reference position and then rotated to be coupled to the designated optical fiber collimator again.

Even when, therefore, switching is not correctly performed occasionally due to a slip of the stepping motor 24 or the like, an automatic test using this optical switch need not be suspended.

In the optical switch 20, six slit arrays are formed for 12 optical fiber collimators 27.

This number is set in consideration of an increase in the number of optical fiber collimators 27.

More specifically, the number of optical fiber collimators 27 can be maximized to 49 (180÷3.6−1) at an interval of 3.6°.

When the number of optical fiber collimators 27 is 12, as described above, the number of slit arrays may be decreased to four.

In the above embodiment, the optical axis of the optical fiber collimator 36 serving as one light guide is directly rotated by the stepping motor 24.

Figure 8:
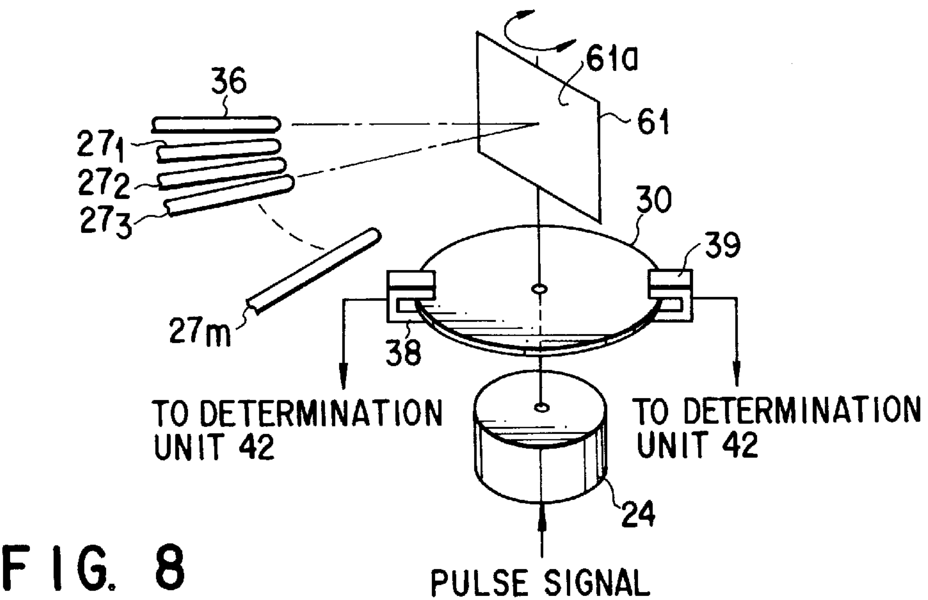
FIG. 8 is a schematic view showing the mechanism portion of an optical switch according to another embodiment of the present invention.

To the contrary, as shown in FIG. 8, the optical fiber collimator 36 may be constituted such that its optical axis crosses those of remaining M optical fiber collimators $\mathbf{27}_1$ to $\mathbf{27}_m$ at one point on a mirror surface 61*a* of a reflecting mirror 61 rotated by the stepping motor 24, and the angle of the reflecting mirror 61 may be detected by the slit disk (encoder) 30.

In the above embodiment, the optical axis of the optical fiber collimator 36 serving as a specific light guide is rotated.

Figure 9:
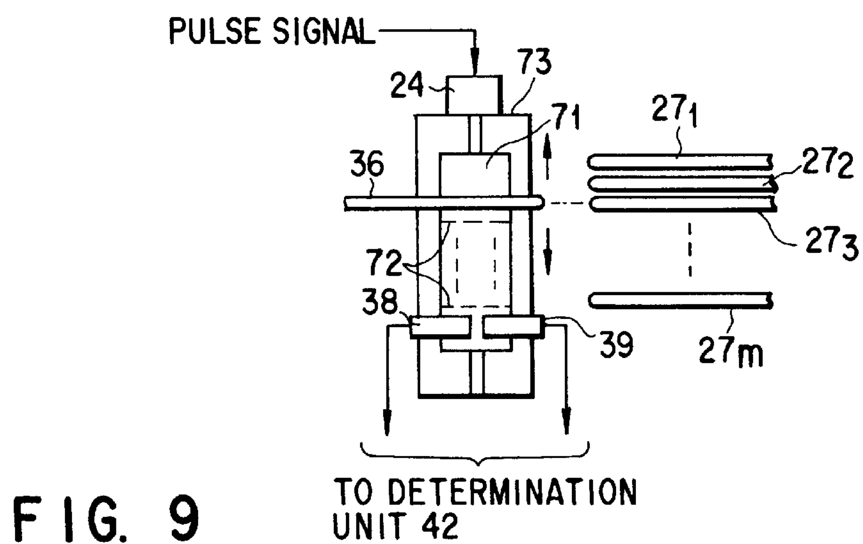
FIG. 9 is a schematic view showing the mechanism portion of an optical switch according to still another embodiment of the present invention.
Figure 10:
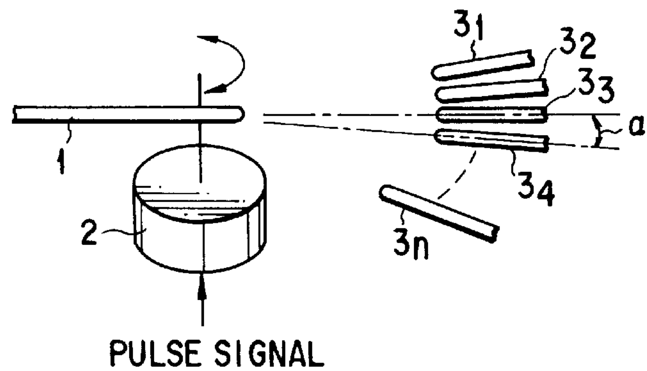
FIG. 10 is a schematic view showing the mechanism portion of a conventional optical switch.

In contrast, as shown in FIG. 9, the optical fiber collimators $\mathbf{27}_1$ to $\mathbf{27}_m$ may be aligned in one straight line at a predetermined interval, the optical fiber collimator 36 may be constituted to be moved parallel to the alignment direction of the optical fiber collimators $\mathbf{27}_1$ to $\mathbf{27}_m$ together with a band-like slit plate (encoder) 71 by a variable mechanism 73 having the stepping motor 24 as a driving source, and slits 72 of the slit plate 71 may be detected by the sensors 38 and 39.

In addition to the method using slits for shielding and passing through light, as in the above embodiment, a plate on which, e.g., a pattern optically detectable by utilizing reflection of light is printed in a bar code may be used.

In the above embodiment, the slits of the slit disk (encoder) 30 are encoded such that output data from the sensors 38 and 39 directly indicates an optical fiber collimator 27 coupled to the optical fiber collimator 36 serving as a specific light guide.

However, this does not limit the present invention. For example, a slit plate (encoder) in which slits are formed in one array at the same interval equal to that between the optical fiber collimators 27 may be moved together with the optical fiber collimator 36, and the number of slits passing through the sensor may be counted to check whether the count result corresponds to a designation signal.

Although the above embodiment has exemplified the optical switch used in the test system for a line made of an optical fiber, the present invention can also be applied to an optical switch which can be manually switched.

In this case, an optical fiber collimator coupled to the specific optical fiber collimator 36 may be externally visually checked by displaying the determination result of the determination unit 42 using a lamp or the like, or displaying the number corresponding to data from the sensors 38 and 39.

Although the above embodiment uses the variable mechanism and the stepping motor as the driving source, the present invention can be similarly applied to an optical switch using, as the driving source of the from a potentiometer.

In the above embodiment, the present invention is applied to the optical switch having one circuit and a plurality of contacts. However, the present invention can also be applied to an optical switch having pluralities of circuits and contacts.

In this case, a plurality of optical lines can be simultaneously tested using a plurality of optical pulse testers (OTDRs).

As has been described above, the optical switch of the present invention is constituted such that, when the switching means drives the variable mechanism so as to couple a specific light guide to a light guide corresponding to a designation signal, the detection means detects the actual motion of the variable mechanism, and the determination means determines whether an output from the detection means corresponds to the designation signal.

According to the optical switch of the present invention, occurrence of a switching error state in which the specific light guide is not coupled to the designated light guide due to an error of the driving source or the like can be easily known.

Even when a plurality of optical lines each made of an optical fiber are tested using this optical switch, the test can be prevented from being erroneously performed.

According to the present invention, the optical switch in which the conventional problems are solved, and an optical path switching error can be known can be provided.

Additional embodiments of the present invention will be apparent to those skilled in the art from consideration of the specification and practice of the present invention disclosed herein.

It is intended that the specification and examples be considered as exemplary only, with the true scope of the present invention being indicated by the following claims.

We claim:

1. An optical switch comprising:

a plurality of light guides for inputting/outputting light;

optical path formation means, having a driving source which operates upon reception of an electrical signal, for forming an optical path extending from a specific light guide of said plurality of light guides to arbitrary one of remaining light guides in order to optically couple said specific light guide to said one arbitrary light guide;

switching means for supplying, to said driving source of said optical path formation means, a predetermined electrical signal for coupling said specific light guide to said one arbitrary light guide; and detection means for detecting a formation position of the optical path formed by said optical path formation means.

2. A switch according to claim 1, wherein said optical path formation means is arranged such that said specific light guide is perpendicularly engaged with a rotating shaft of a motor serving as said driving source, and said remaining light guides are arrayed with a predetermined interval at positions concentric with said rotating shaft of said motor where said remaining light guides can face said specific light guide perpendicularly engaged with said rotating shaft of said motor.

3. A switch according to claim 2, wherein said detection means comprises an encoder engaged with said rotating shaft of said motor to present optical path formation position information corresponding to the predetermined interval.

4. A switch according to claim 3, wherein said encoder comprises a slit disk having a predetermined slit array presenting the optical path formation position information.

5. A switch according to claim 4, wherein said detection means comprises a sensor for detecting the predetermined slit array of said slit disk.

6. A switch according to claim 1, wherein said optical path formation means has a reflecting mirror engaged with a rotating shaft of a motor serving as said driving source, said specific light guide is arranged at a position where light can be incident on said reflecting mirror, and said remaining light guides are arrayed with a predetermined interval at positions where the light returning from said reflecting mirror can be received.

7. A switch according to claim 6, wherein said detection means comprises an encoder engaged with said rotating shaft of said motor to present optical path formation position information corresponding to the predetermined interval.

8. A switch according to claim 7, wherein said encoder comprises a slit disk having a predetermined slit array presenting the optical path formation position information.

9. A switch according to claim 8, wherein said detection means comprises a sensor for detecting the predetermined slit array of said slit disk.

10. A switch according to claim 1, wherein said optical path formation means has a linear movement mechanism driven by a motor serving as said driving source, said specific light guide is engaged with said linear movement mechanism to be perpendicular to a movement direction of said linear movement mechanism, and said remaining light guides are arrayed with a predetermined interval at positions where said remaining light guides can face said specific light guide engaged with said linear movement mechanism to be perpendicular to the movement direction of said linear movement mechanism.

11. A switch according to claim 10, wherein said detection means comprises an encoder engaged with said linear movement mechanism to present optical path formation position information corresponding to the predetermined interval.

12. A switch according to claim 11, wherein said encoder comprises a slit plate having a predetermined slit array presenting the optical path formation position information.

13. A switch according to claim 12, wherein said detection means comprises a sensor for detecting the predetermined slit array of said slit plate.

14. A switch according to claim 1, wherein said switching means receives a signal designating said one arbitrary light guide, and supplies an electrical signal corresponding to the signal, to said driving source.

15. A switch according to claim 14, further comprising determination means for determining whether an output detected by said detection means corresponds to the signal designating said one arbitrary light guide.

16. A switch according to claim 15, wherein, when said determination means determines that the output from said detection means does not correspond to the signal designating said one arbitrary light guide, said switching means further supplies, to said driving source, an electrical signal for coupling said specific light guide to said one arbitrary light guide.

17. A switch according to claim 1, wherein said detection means detects a direction and position of said specific light guide, said one arbitrary light guide, or an optical member interposed between said specific light guide and said one arbitrary light guide.

18. An optical switch for selectively coupling a specific light guide to arbitrary one of a plurality of light guides by using optical path formation means which operates upon reception of an electrical signal, comprising:

an encoder arranged in association with said optical path formation means, for representing optical path formation position information corresponding to a formation position of each optical path which should be formed by coupling said specific light guide to said one arbitrary light guide;

switching means for supplying, to said optical path formation means, an electrical signal corresponding to the optical path formation position information represented by said encoder; and detection means for detecting the optical path formation position information represented by said encoder when said optical path formation means operates in accordance with the electrical signal supplied by said switching means, wherein a switching operation of said optical switch can be determined based on a detection output from said detection means.

19. A switch according to claim 18, wherein said encoder comprises a slit member engaged with a rotating shaft of a motor serving as said optical path formation means and having a predetermined slit array presenting the optical path formation position information.

20. A switch according to claim 18, wherein said detection means comprises a sensor for detecting a predetermined slit array of a slit member.

* * * * *

UNITED STATES PATENT AND TRADEMARK OFFICE
CERTIFICATE OF CORRECTION

PATENT NO. : 5,960,134
DATED : Septemeber 28,1999
INVENTOR(S) : Hideyuki SAKAMOTO et al.

It is certified that error appears in the above-identified patent and that said Letters Patent is hereby corrected as shown below:

In the Drawings,

Fig. 6, in box S2, change "BETTWEEN" TO --BETWEEN--.

Signed and Sealed this

Twenty-seventh Day of March, 2001

Attest:

Nicholas P. Godici

NICHOLAS P. GODICI

*Attesting Officer*

*Acting Director of the United States Patent and Trademark Office*